Jan. 24, 1956  T. H. STIEBEL  2,732,478
IMMERSION HEATER
Filed Dec. 22, 1952  7 Sheets-Sheet 1

INVENTOR.
THEODOR H. STIEBEL
BY
his attorney

Jan. 24, 1956　　　T. H. STIEBEL　　　2,732,478
IMMERSION HEATER
Filed Dec. 22, 1952　　　　　　　　7 Sheets-Sheet 2

INVENTOR.
THEODOR H. STIEBEL
BY
His Attorneys

Jan. 24, 1956  T. H. STIEBEL  2,732,478
IMMERSION HEATER
Filed Dec. 22, 1952  7 Sheets-Sheet 3

INVENTOR.
THEODOR H. STIEBEL
BY
His Attorney.

Jan. 24, 1956     T. H. STIEBEL     2,732,478
IMMERSION HEATER

Filed Dec. 22, 1952     7 Sheets-Sheet 4

INVENTOR.
THEODOR H. STIEBEL
BY

Jan. 24, 1956   T. H. STIEBEL   2,732,478
IMMERSION HEATER

Filed Dec. 22, 1952   7 Sheets-Sheet 5

INVENTOR.
THEODOR H. STIEBEL
BY
His Attorney

Jan. 24, 1956   T. H. STIEBEL   2,732,478
IMMERSION HEATER

Filed Dec. 22, 1952   7 Sheets-Sheet 6

INVENTOR.
THEODOR H. STIEBEL
BY
His Attorney

Jan. 24, 1956  T. H. STIEBEL  2,732,478
IMMERSION HEATER

Filed Dec. 22, 1952  7 Sheets-Sheet 7

INVENTOR.
THEODOR H. STIEBEL
BY
His Attorney

United States Patent Office 2,732,478
Patented Jan. 24, 1956

2,732,478

IMMERSION HEATER

Theodor H. Stiebel, Holzminden (Weser), Germany

Application December 22, 1952, Serial No. 327,194

16 Claims. (Cl. 219—41)

The instant invention relates to immersion heaters with integral switching means for connecting and disconnecting the electrical heating element to the line.

An object of the invention is to provide automatic means integral with the immersion heater to switch off current from the heating element when the heater reaches a predetermined temperature.

A further object of the invention is to provide automatic switching means integral with the immersion heater adapted to switch off the current when the heater attains a predetermined temperature and again to switch the current on when the temperature of the heater has decreased to a predetermined lower magnitude.

Another object of the invention is to provide automatic cut-off means integral with the immersion heater which may be set for a single disconnect operation at a predetermined temperature and must be reset manually prior to any subsequent operation.

Still a further object is to provide automatic switching means integral with the immersion heater which may be set as desired for a single disconnect operation and for a plurality of successive connect and disconnect operations thereof.

Still a further object is to provide a liquid-tight construction of immersion heater having means integral with the exterior of the heater for adjusting an automatic switching mechanism within the heater to either the single disconnect position or to the position of successive disconnect and connect operations.

Still another object is to provide visual and acoustic indicating devices to advise of the operative condition of the immersion heater with respect to the visual indicating means, or of the disconnect condition with respect to the acoustic device, both being operated by the integral automatic switching means.

Still a further object is to provide an immersion heater having the aforementioned visual and acoustic indicating devices within the terminal housing of a flexible cord connector of the heater to the line supply.

Immersion heaters of various constructions are prior known including types with integral temperature limiters to avoid fire hazards when the heater is, for one reason or another, operating in a dry atmosphere, for example without disconnecting the line supply the heater is inadvertently or negligently removed from the liquid to be heated, or the latter has boiled away. Thus, prior known types having automatic disconnecting means include those using fusible elements in the internal line of the heater or thermally responsive means of various kinds within the heater which disconnect the line supply on excessive heating.

Immersion heaters should not only cause the liquid into which they are immersed to boil or reach a predetermined temperature, but should also maintain the liquid at just the predetermined temperature. Since the required temperature is different in different applications and uses, the switching means should be externally operable while maintaining the heater liquid-tight to prevent seepage into the interior of the heater. I accomplish this in the immersion heater of the instant invention by a construction in which an externally adjustable screw may be set to adjust the switching device within the heater from a mere cut-off device to a control device, that is, one which cuts off but when a predetermined lower temperature is reached, again connects the line current to the heating element. I also provide, either in the heater per se or in the connector to the line supply, indicating means which visually or acoustically advise the user of the particular operating condition of the heater. When the integral switching means is set for mere disconnect, the heater remains disconnected after once operating until a push button means extending externally the heater is manually depressed. However, when the switching means is set for control by the adjustable screw, the push button means is without effect and the switching device is automatically switched on and off to maintain the liquid temperature at the predetermined magnitude. The signal indicators may be so arranged that when the current supply is connected the visual indicator lights up, while when the line supply has been switched off the acoustic indicator is actuated to call the attention of the user to the fact that the particular heating is completed, for example, that the eggs in the water have been boiled.

The above objects, as also others, will become more readily apparent from the following description of the immersion heater with built-in switching means of my invention in various illustrative embodiments in conjunction with the appended drawings in which.

Figure 1:
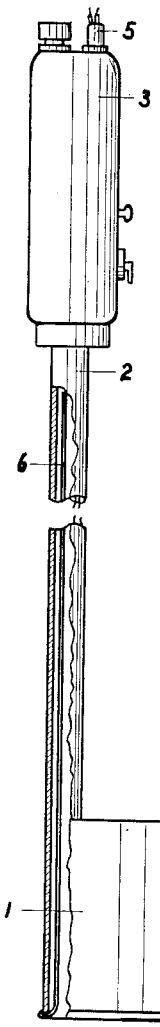
Figure 1 is an elevational view of one illustrative embodiment of the immersion heater of my instant invention, partially in section.
Figure 2:
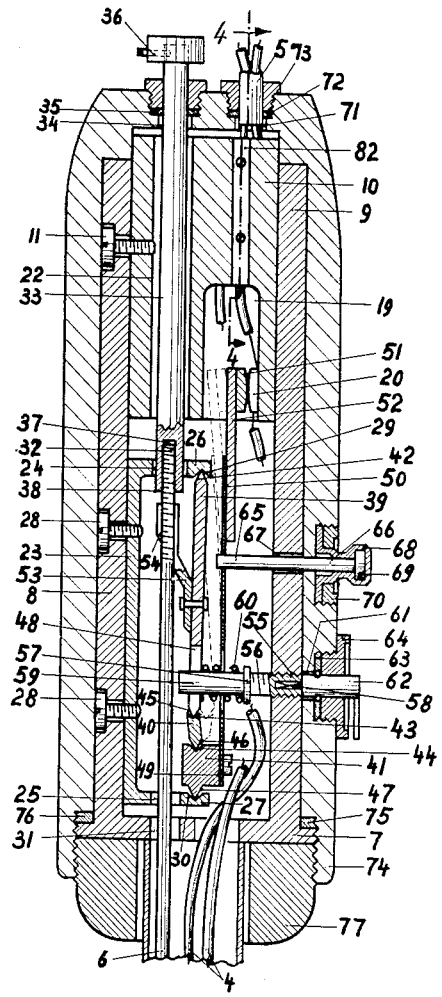
Figure 2 is an elevational section, on an enlarged scale, as compared to Figure 1, of the handle of the embodiment showing the switching means operable by the temperature responsive elements in its preoperated position.
Figure 3:
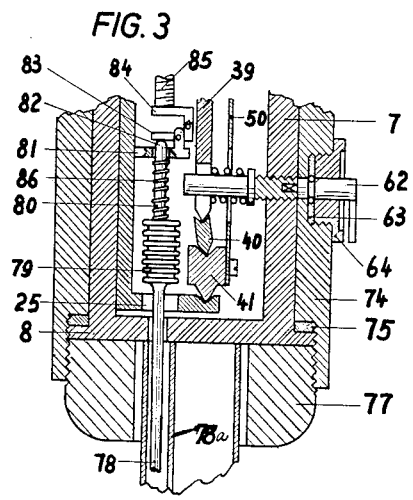
Figure 3 is a portion of the showing of Figure 2 modified for actuation by thermally expansive liquid.
Figure 4:
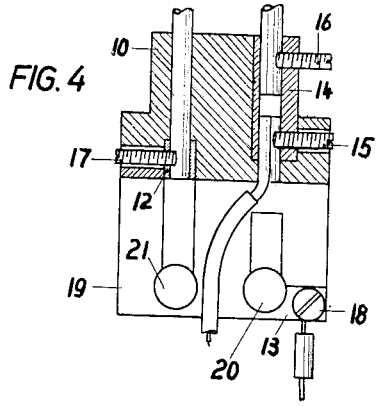
Figure 4 is a section through the terminal block of Figure 2 on line 4—4.

Referring to the drawings, and more particularly to the embodiment shown in Figures 1 to 4, the immersion heater comprises a hollow cylinder 1 housing the heating element per se, the metal shank 2, of brass for example, and the hollow insulating handle or grip 3 connected to the cylinder by the shank. Connecting wires 4 insulated by particles of insulation or a covering of insulation thereon, within the shank connect the heating element to terminals within the handle which in turn, as hereinafter described, are connected to the line cable 5. A rod 6 of a metal, for example Invar, having a coefficient of thermal expansion less than that of the metal, brass, of the shank 2, has its lower end affixed to a convenient point, for example the bottom, within the shank 2 or the cylinder 1, and extends freely upward through the shank into the handle. Integral with the upper end of the shank, a transverse ring 7 supports two spaced vertical rods, 8 and 9, extending into the handle and between the upper ends of which rods, a formed block 10 of insulating material is supported in the upper interior region of the handle by one or more set screws 11 through one or both the supporting rods 8 and 9. Embedded in block 10 are a plurality of hollow metallic terminals, 12 and 14, for connection of the conductors of the line cable 5 and the heating element connecting wires 4. Thus an end of one connecting wire 4 is clamped in terminal 14 by screw 15, the end of one cable wire 5 being held in the same terminal by screw 16, the other end line cable wire 5 being held in terminal 12 by screw 17, while the end of the other connecting wire 4 is held in terminal 13 by screw 18. Within an inverted U-shaped and relatively wide channel 19, extending upwardly from the lower face of the formed block 10, a pair of spaced silver contacts 20 and 21 are sunk into one face of the channel, contact 20 being electrically connected to terminal 13 and contact 21 being electrically connected to terminal 12. Thus unless contacts 20 and 21 are conductively bridged as hereinafter described, the circuit to the heating coil is open. The bore 22 extending vertically through block 10 is coaxial with the Invar rod 6 extending into the interior of grip 3.

A U-shaped channel 23, having bores 24 and 25 in its respective arms 26 and 27 is affixed by means of a pair of set screws 28 to one of the supporting rods, for example 8, so that the bores 24 and 25 are both coaxial with bore 22 and rod 6. In the facing surfaces of arms 26 and 27, and near the free end of each, a V-shaped groove 29 and 30 is provided. The rod 6 passes freely through the bore 31 in the shank ring 7, the bore 23 of channel arm 27, and bore 24 of channel arm 26, the free end region 32 of rod 6 being threaded. A shaft 33 projects from the exterior of the grip 3, freely movable longitudinally through the bore 22 in formed block 10 and the coaxial bore 34 in grip 3. Packing 35 in bore 34 and about the portion of shaft 33 passing through grip 3, prevents any seepage of liquid into the interior of grip 3. Externally of the grip 3, the shaft 33 carries a knob 36, while the lower end of the shaft is internally threaded and screwed onto the externally threaded end region 32 of rod 6. The internally threaded end 37 of shaft 33, while still of a diameter small enough to slide in bore 22, is of a larger external diameter than is the end region 32 of rod 6, and hence its lower face 38, when so threaded onto rod end region 32, forms an annular shoulder for a purpose immediately to be described. Of a combined length equal to the distance from the bottom of groove 29 to the bottom of groove 30 when axially aligned, three levers 39, 40 and 41 are aligned in that succession between the grooves.

The upper one 39 of these levers has a knife edge in each end, the knife edge 42 being more acute than is groove 29 in which it bears. The intermediate lever 40 and the lower lever 41 each have in their upper ends a V-groove, 43 and 44, which is less acute than the respective lower knife-edge ends, 45 and 46, of the upper lever 39 and the intermediate lever 40, the lower end 47 of the lower lever 41 being a knife edge more acute than groove 30 of channel arm 27. The upper lever 39 is the longest of the system, and has a slit 48 extending through the lower half thereof, while the intermediate lever 40 is the shortest of the three. Lower lever 41 has a lateral projection 49 to which is affixed an upwardly extending spring arm 50 carrying at its upper free end a conductive bridge 51 insulated from arm 50 by the insulating spacer 52. Conductive bridge 51 is adapted to engage and bridge the contacts 20 and 21, thus to complete the circuit to the heating coil when the levers 39, 40 and 41 are actuated. A rigid bend 53 has one end attached to the lever 39 at substantially the midlength region of the latter so that the free end 54 of the bend lies in the path travelled by the threaded end 37 of shaft 33 and is engaged by the annular lower shoulder 38 thereof on sufficient downward movement of Invar rod 6.

Through a threaded bore 55 in support rod 9, a pin 56 is threaded so as to extend laterally through the slit 48 of the lever 39, with the shoulder 57 of the pin 56 positioned between the spring arm 50 and the support rod 9. A square hole 58 extends into the pin from the threaded end region of pin 56, while the other end region 59 of the pin is adapted to pass through slit 48 and extend through it in all positions of lever 39 during the latter's operation. A coiled spring 60 is supported about the pin 56, the spring ends bearing against shoulder 57 and the adjacent face of lever 39 respectively, the spring passing freely through a registering opening in spring arm 50. Grip 3 also has a bore 61 registering with bore 55 through which bore 61 the shaft of key 62 projects so that the square end of the key engages square hole 58. Key 62 thus permits adjustment of the tension of spring 60 so that arm 50 is so positioned, by appropriate action of the level system, that bridge 51 engages contacts 20 and 21 at normal temperature and disengages therefrom at the predetermined heating temperature when end 54 is depressed by the annular shoulder 38 under the control of the relative motion of Invar rod 6 in respect of shank 2 on heating. The shaft of key 62 is surrounded by packing 63 held in the bore by packing nut 64. Structurally pin 56 is not permitted to extend out of the grip for the latter could not then readily be made watertight as it is by the just described structure.

A restoring pin 65 extends through the bore 66 in the grip and through the registering bore 67 in support rod 9, somewhat above the threaded bore 55. Restoring pin 65 is of such length that when pressed inwardly from externally the grip it engages lever 39 and pivots it sufficiently in its groove 29 axially to align all three levers, 39, 40 and 41, that is, to cause bridge 51 to engage contacts 20 and 21. The portion of the pin 65 extending externally the grip is covered by a preformed rubber sheath 68 of which the free edge is clamped into the bore 66 and about the enlarged head 69 of the pin by the nut 70. Just as soon as the external pressure is relieved on pin 65 then, the preformed resilient sheath 68 restores the pin to its preoperated position. As will also be noted, the sheath 68 in addition renders the grip watertight at this bore 66.

The upper face of the grip has a further bore 71 which is adjacent to bore 34 and through which the line cable 5 is brought from terminals 12 and 13, the bore being rendered watertight by packing 72 and packing nut 73. The lower end 74 of the grip is open and internally threaded with a shoulder 75 at its top, between which shoulder and the shank ring 7 a packing ring 76 is positioned, the split nut 77 threading into the open end 74 about the upper end of the shank and against ring 7, thus rendering the lower end of the grip watertight also. Hence it follows that all openings into the grip are sealed to prevent any seepage of water into the interior.

When the immersion heater is connected to the electric line, the heating element is energized, since normally in the preoperated position, bridge 51 engages contacts 20 and 21 completing the circuit. As heating progresses, the lengths of the Invar rod 6 and shank 2 change unequally due to the different coefficients of thermal expansion. Rod 6, having the smaller coefficient and hence total expansion, is thus moved downwardly since its outer end is affixed to the outer end region of the shank. In its downward motion, rod 6 carries the shaft 33 threaded to it with it until ultimately the lower annular face 38 of the shaft engages the end 54 of the bend 53. The temperature at which this occurs may be regulated by threading more or less of rod end region 32 into the threaded shaft end 37 by rotation of knob 36 on the shaft. On continued movement of rod 6 downwardly, the engagement of annular shoulder 38 and bend end 54 pivots the lever 39 about its end 42 in groove 29 so that its lower end region moves to the right, as shown by the dashed lines in Figure 2, thus tilting the lower end of lever 40 and the upper end of lever 41 to the left, which carries spring arm 50 to the left, disengaging the bridge 51 from the contacts 20 and 21. With the spring 60 braced between the shoulder 57 and the lever 39, as rod 6 moves upwardly on cooling and relieves the pressure against bend end 54, the tension of spring 60 tends to force the lower end of lever 39 to the left and when shoulder 38 leaves end 54, lever 39 is pivoted under the tension of the spring to restore engagement between bridge 51 and contacts 20 and 21. Thus with spring 60 so braced, the mechanism serves as an automatic controller tending to keep the liquid to be heated at the predetermined heated temperature by repeatedly completing the circuit each time the liquid drops below the predetermined temperature. The pin 56 may, however, be rotated by the key 62 that the shoulder 57 does not bear against the adjacent end of spring 60. In such event, the mechanism will operate purely as a switch turning off the current when the predetermined heating temperature is reached, and cannot automatically be restored. In this situation, it being desired again to have bridge 51 engage contacts 20 and 21, the restoring pin 65 is actuated by pressing it inwardly against lever 39 to return, as above stated, the bridge to the contact engaging position.

The two differentially expansible materials need not be metals, one may be a liquid, for example. Thus in the modification shown in Figure 3, the Invar rod 6 has been replaced by a thermally expansive liquid within a tube 78, which tube runs the length of the shank 2 through its interior, the lower end of the tube being affixed to the bottom of the cylinder housing the heating element. The tube 78 is preferably in a lengthwise shank region separated by a longitudinal wall 78a, as shown in the figure, from the remaining interior region of the shank. The upper end of tube 78, extending into the grip interior, terminates in a cylindrical bellows 79 of which the free movable end has an integral pin 80 extending upwardly and coaxial with shaft 33. A bracket 81 is affixed to the supporting rod 9 and has a bore 82 through which the free end of pin 80 extends to engage a lever 83 pivoted on bracket 81 (to the right of pin 80 in Figure 3). An elbow 84, linked to lever 83 at the end region thereof to that side of the pivot opposite that against which pin 80 bears, is integral with the lower end of a shaft 85 threaded into the enlarged internally threaded end 37 of shaft 33. The other elements of the switching means are as above described. Because the liquid has the greater coefficient of thermal expansion as compared to the metal of the shank, on heating the fluid within tube 78 and bellows 79 expands and extends the bellows 79, moving pin 80 upwardly against the one end of lever 83 to depress its other end, and with it, elbow 84, shaft 85, and annular face 38 of shaft 33, thus ultimately actuating the system of levers 39, 40 and 41 as above described to remove bridge 51 from its engagement with contacts 20 and 21. The coiled spring 86, positioned about pin 80 and bearing between the lower face of bracket 81 and the upper movable face of bellows 79, restores the mechanism on cooling to its pre-operated position in obvious manner, restoring the bridge to its contact engaging position, however only if as above stated, coiled spring 60 is tensioned against shoulder 57 of pin 56.

Figure 6:
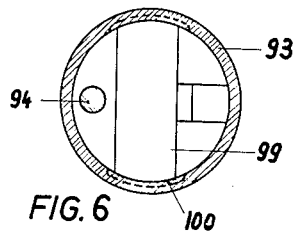
Figure 6 is a section along line 6—6 of Figure 5.
Figure 5:
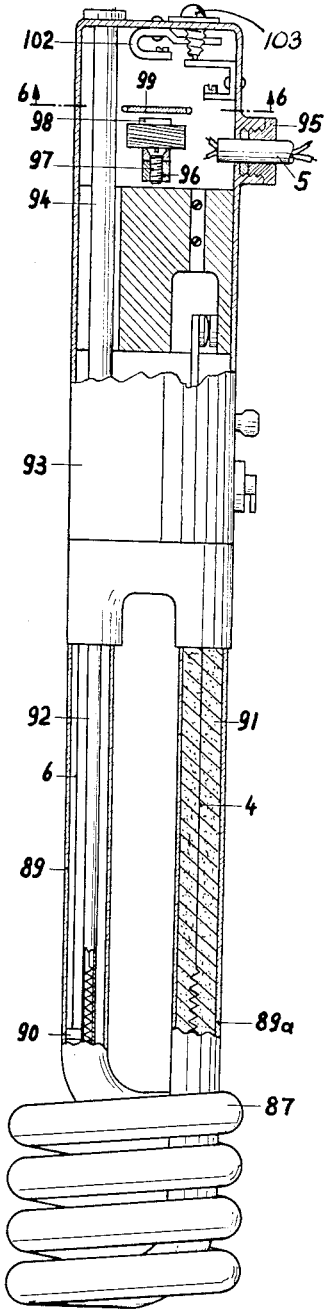
Figure 5 is an elevational view, partially in section, of a modified embodiment of the immersion heater of this invention incorporating in the handle a plurality of means indicating the operational condition of the heater.
Figure 7:
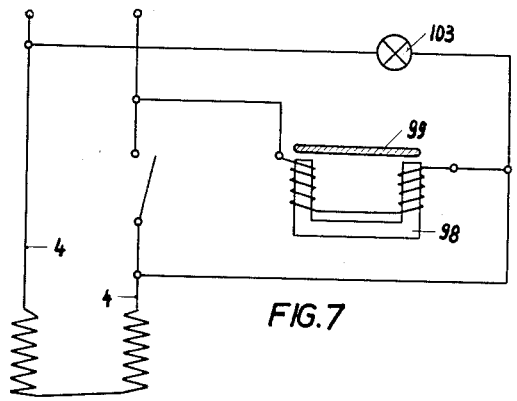
Figure 7 is a circuit diagram of the Figure 5 embodiment.

In a modified embodiment of the instant invention, of which mainly the details, varying from such as have been described for the foregoing illustrative embodiments, are shown in Figures 5 to 7 inclusive, the grip, in addition to housing the switching means, also houses visual and auditory signals operable by the particular operating condition of the immersion heater. In this embodiment, the heating element may for example be housed in a lower coiled portion 87 of a continuous metal tube having two parallel shanks 89, 89a, through the interior of which a connecting wire 4 passes and is connected to the heating coil terminals. One shank 89 has the rod 6 in its interior, the lower end of rod 6 being, as before, affixed to a lower end region of the shank by a bracket 90. Shank 89a is filled with the insulating mass 91 while a tube 92 of insulating material encloses the connecting wire 4 in shank 89 to prevent any possibility of electrical contact between rod 6 and the connecting wire. The grip 93 is generally of the shape of grip 3 but longer to accommodate within its top region a visual signal and an auditory signal; and similarly shaft 94 differs from shaft 33 of Figures 2 and 3 only in that it is longer. Cable 5 is brought into the interior of the grip 93 through the bore 95 in a side face of the grip, the bore being waterproofed in the same manner as described for bore 70. On a plate 96 of insulating material, fixed above bore 95 within the grip interior and held by set screws 97, is carried an electromagnetic buzzer 98 having an ellipsoidal diaphragm 99. Portions of the periphery of diaphragm 99 are supported in the groove 100 in the inner surface of the grip. Plate 96 is formed as a narrow strip to permit the connecting wires necessary to pass at its sides and also for the passage of shaft 94. A lamp socket 102 is mounted in the upper face of the grip into which incandescent electric lamp 103 fits quite flush with the grip surface. The wiring of the two indicating devices, shown in the schematic of Figure 7, is such that when the heater is energized incandescent lamp 103 is lighted, and when the heating operation is completed, that is, the circuit disconnected thereafter with the line still connected, the buzzer 98 sounds to call attention thereto and the light 103 is extinguished.

Figure 8:
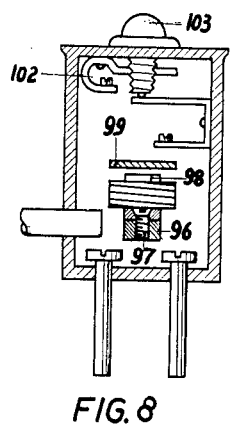
Figure 8 is a longitudinal section showing the indicating means installed within the housing of the connector to the line supply.

Figure 8 shows a modification providing the indicating means, such as an incandescent light when operating and a buzzer when the heating circuit has been opened, arranged within the connector plug of the immersion heater. Obviously all parts of the indicating means, excepting the connector housing, resemble those shown in Figure 5 and hence like reference numerals are employed in the two figures.

Figure 9:
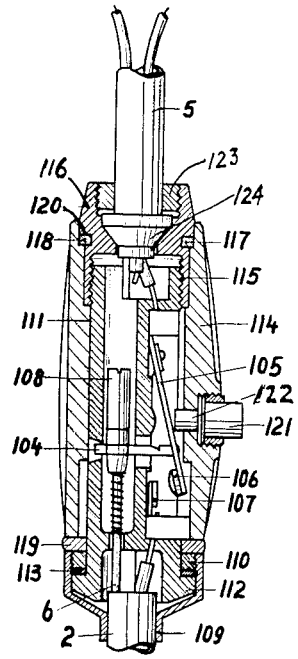
Figure 9 is a longitudinal section of another simplified embodiment showing cut-off means within the handle of the immersion heater of the invention.

Another illustrative embodiment of the grip of the immersion heater is illustrated in Figure 9, providing a cut-off switch only which will interrupt the electrical supply line to the heating element when a predetermined temperature has been reached. The supply cable 5 is brought into the interior of the grip in a similar fashion to that shown in Figures 2 and 5. As a result of the difference in expansion on heating between shank 2 and rod 6, the lever 104 is pulled downwardly, thus releasing the contact spring 105 and disconnecting the electrical circuit by breaking the contacts 106 and 107. Screw 108 is provided for adjusting the predetermined temperature at which disconnect will take place. Fixedly connected to shank 2 is the cup-shaped member 109 which is internally threaded. Nut 110 pressingly engages the shoulder 112 of the switch housing 111, thus rigidly connecting the latter to shank 2. A seal ring 113 is placed between nut 110 and shoulder 112. The upper end region of switch housing 111 has been provided with a threaded end 115. An exterior cylindrical member 114 is pushed over the two half shells of the switch housing 111, holding them together. At its upper end, the exterior cylindrical member 114 has a shoulder 117 on which a seal ring 118 is placed. Another seal ring 119 is placed between the bottom surface of member 114 and the nut 110. An internally threaded member 116, at the top of the exterior member 114 screws onto the threaded end 115 of switch housing 111, and presses with its shoulder 120 against the seal ring 118. The threaded nut 123 about the supply cable 5 is screwed down into member 116 pressing the flexible cone 124 about the end of the supply cable tightly into the bore of member 116. Thus the external parts are all pressed rigidly together and the grip is rendered water tight. A restoring button 121 has its pin 122 extending through a bore in member 114 and the shell 111, the pin 122 being of such length as to engage the contact spring 105 on being pressed inwardly to engage contact 106 to contact 107 and to latch lever 104 to spring 105, providing the lever 104 is in its normal position which it is when the heater is below its predetermined elevated temperature.

Figure 10:
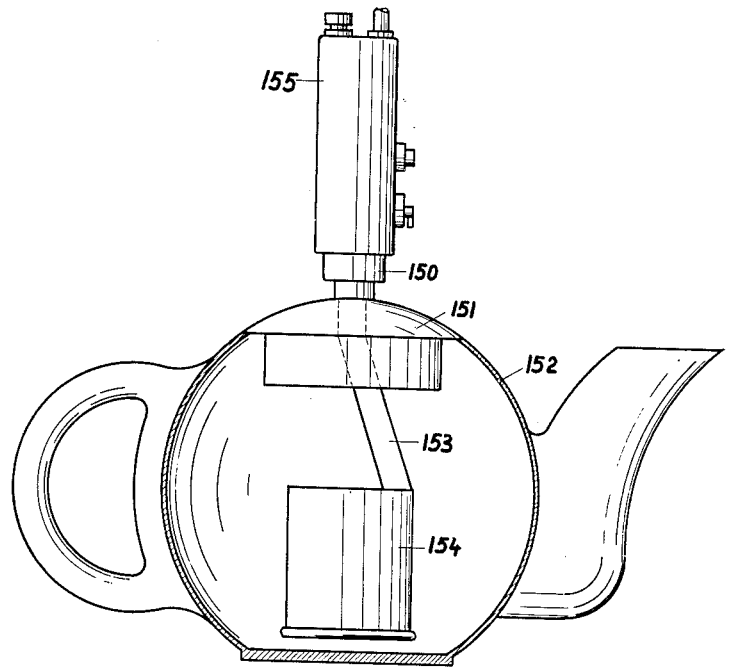
Figure 10 is a simplified elevation, partially broken away, showing the immersion heater integrally supported in the cover of a tea pot.

Immersion heaters with built-in automatic switches as above described, may be used with any convenient utensil for heating liquids. They may also be built right into the utensil, or cover thereof, used for heating liquids. Thus Figure 10 shows an immersion type heater 150, of which the details may be like those of the heaters above described, permanently built into the cover 151 of a teapot 152. Immersion heater shank 153 is at such an angle to the vertical axis of the pot and cover that both the cylinder or coil 154, housing the heating element, and the grip 155, housing the automatic switch, are substantially coaxial with such axis.

In the immersion heater with automatic switching means shown in Figures 11 to 15 inclusive, which is incorporated in the wall of a water kettle 160, the heating element is preferably housed in a flat coil or spiral 161, the straight shanks 162 and 163 being substantially parallel to the plane of the coil. The shanks project from a metal plate 164 having an integral annular portion 165 of lesser diameter projecting to the exterior of kettle 160. The outer cylindrical surface of annular portion 165 is threaded to receive the nut 167 by which the plate 164, with an interposed packing ring 168, is tightly clamped to the wall of the kettle thus preventing leakage at this wall discontinuity. In each shank a connecting wire, 169 and 170, connects to the heating coil per se, not shown, one of the shanks also housing a rod 171 of a metal having a smaller coefficient of expansion than that of the metal of the shank, of which one end is affixed to a stop 172 integral with the shank wall and exposed to the heating action and the other end extends externally from the kettle. A bearing block 173, extending from the external face of plate 164, pivotally supports the lever 174 the arm of which is substantially transverse to rod 171 having a lip 175 at its free end, and is tensioned by a spring 176 also projecting from plate 164, to rotate it counter-clockwise (in Figure 12). In that figure, the right end 177 of rod 171 extends through lever 174 and is threaded to receive a nut 178 which may be rotated from outside the kettle. Two or more spacer bolts 179 project into the interior of ring member 180 being threaded into the plate 164, the regions through which the bolts pass of plate 181 being made watertight. Two contacts 182 and 183 are fixedly connected to a supporting member 184 made of insulating material. A pin 186 slidingly projects through a bore 187 of the supporting member 184 carrying a contact holder plate 188 made of insulating material. Two contacts 189 and 190 are fixedly arranged on plate 188 in such position as to come into contact with contacts 182 and 183 when pressed toward them by spring 191, contacts 189 and 190 being bridged by conductor 185. A spring 192 positioned about pin 186 rests with its one end on plate 184 while its other end presses against pin 193 fixedly mounted on pin 186 in such manner that there is a small gap remains between pin 193 and plate 188 when the contact points are in engagement. It will be readily noted that spring 192 will force plate 188, with its contacts 189 and 190, away from contacts 182 and 183 as soon as lip 175 disengages lip 194 rigidly affixed to pin 186, thus breaking the electrical circuit. To reset the immersion heater ready for heating, knob 195 of pin 186 must be pushed inwardly until lip 175 again engages with catch 194.

Assume the kettle has been filled with water and the line has been connected to terminals 196 and 197, and that the pin 186 has been pushed inwardly and is held in its position by latching of lip 175 with catch 194. On heating, shank 162 expands more than rod 171 which thus is drawn into the shank. Nut 178 thus presses against lever 174 and rotates it against the tension of spring 176, thus gradually sliding lip 175 from catch 194 until at the desired temperature the lip and catch disengage and the catch by the tension of spring 192, is snapped outwardly of ring member 180 in Figure 12. Bridge plate 188 is carried along by pin 193 and breaks the engagement between contacts 182 and 190, and 183 and 189. Obviously, the temperature at which disengagement takes place depends on the spatial position of nut 178, for the more the nut is threaded onto rod 171 the less lip 175 overlaps catch 194, and vice versa.

Figure 11:
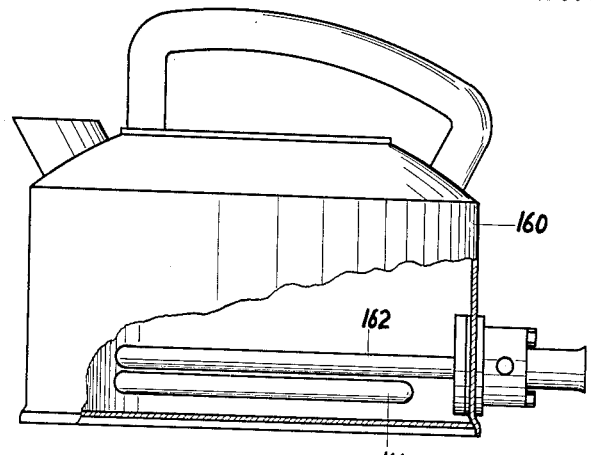
Figure 11 is a simplified elevation, partially broken away, showing the immersion heater integrally supported from the side wall of water kettle.
Figure 12:
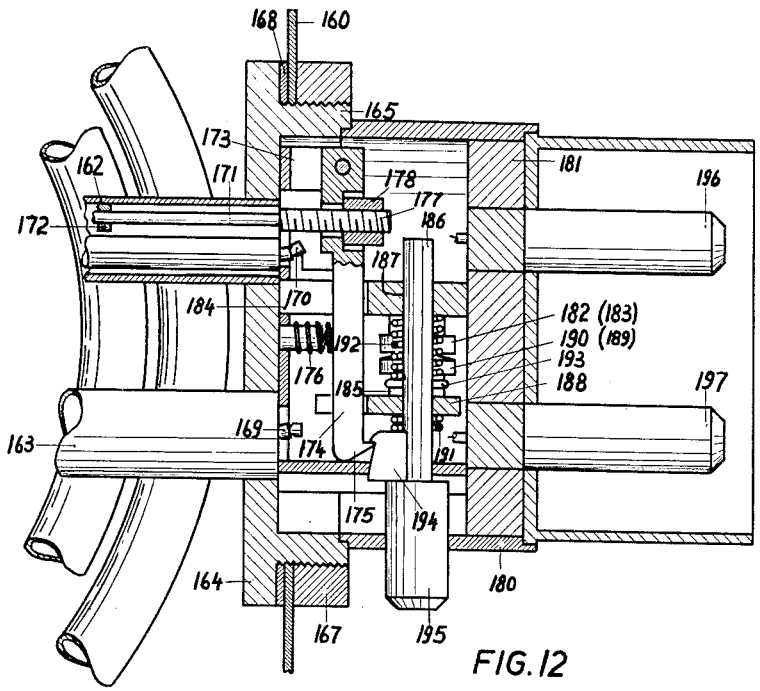
Figure 12 is a longitudinal section through the switching mechanism of the immersion heater of Figure 11.
Figure 13:
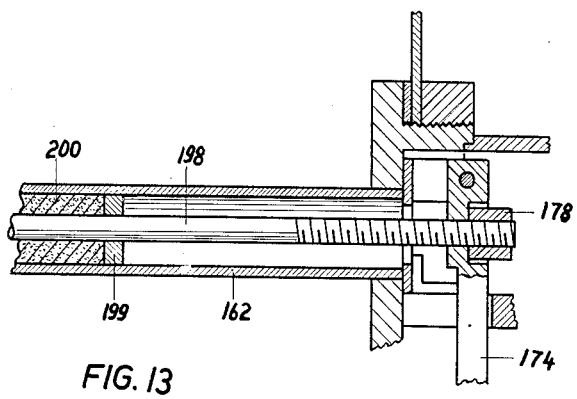
Figure 13 is a partial modification of the structure shown in Figure 12.

In the modification of Figure 13 of the embodiment of Figures 11 and 12, the expansible rod of the lower coefficient of expansion 198 is used as one of the connecting wires for supplying current to the heating coil. Thus the Invar rod 198 is threaded and has the insulating nut 178 threaded on its end projecting through lever 174 while within the shank 162 it is attached to a fixed point within the range of the heating element per se by means of a stopper 199 of insulating material, the stopper also serving to keep the granular insulation particles 200 about the heater coil and in the shanks. The nut end of rod 198 is electrically connected to one of contacts 182 and 183 while its other end is directly connected to one end of the heating coil beyond the stopper 199.

Figure 15:
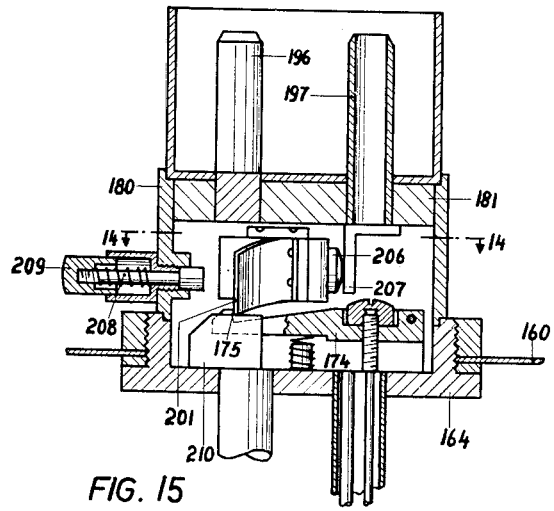
Figure 15 is a section along line 15—15 of Figure 14.
Figure 14:
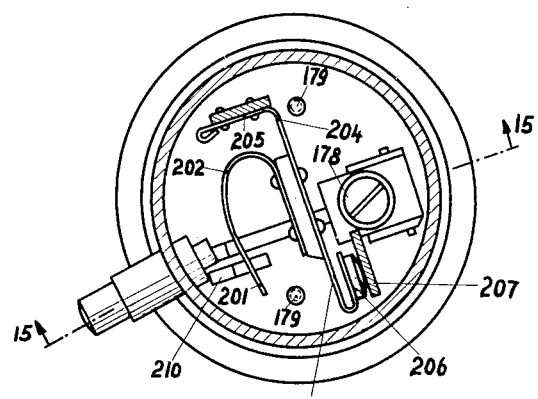
Figure 14 is a section similar to that of Figure 12 showing a modification in the cut-off means.

In the further modification shown in Figures 14 and 15, of the just described switching mechanism of Figures 11, 12 and 13, the lip 175 is adapted to engage the free bent-over portion 201 of the leaf spring 202 carried on the spring arm 203 of the elbow 204 of which the other arm 205 is affixed to plate 181. On the opposite face of arm 203, the contact 206 is adapted to engage the terminal bridge 207 of the lead-in prong terminal 197 when the lip 175 engages the portion 201, thus completing the supply circuit to the heating coil. After removal of lip 175 from portion 201, spring arm 203 being no longer under the pressure of bent-over portion 201, breaks the engagement between contacts 206 and 207, thus breaking the supply circuit. Portion 201 now rests against the spring pressed pin 208, extending watertight through ring member 180 and carrying external button 209. On depression of self-restoring button 209, rod 171 having cooled sufficiently, portion 201 is depressed to slide over and under lip 175 until it engages the lower face of the lip, thus again closing the heater circuit. When portion 201 is engaged with lip 175 its free end rests on support member 210 which is an integral part of plate 164. The support member 210 serves to hold portion 201 always within the same position with respect to the pivot point of lever 174. While adjusting nut 178 of lever 174 is movable up or down, portion 201 rests on support member 210 so that by adjusting nut 178, the overlapping distance at lip 175 may be changed and thus the desired temperature be predetermined. Nut 178 is coaxially positioned relative to the terminal 197 (Figure 15) which is shown as a tubular shell, as a result of which nut 178 may be adjusted by inserting a screw driver through terminal 197 into a slot of the nut 178.

Figure 16:
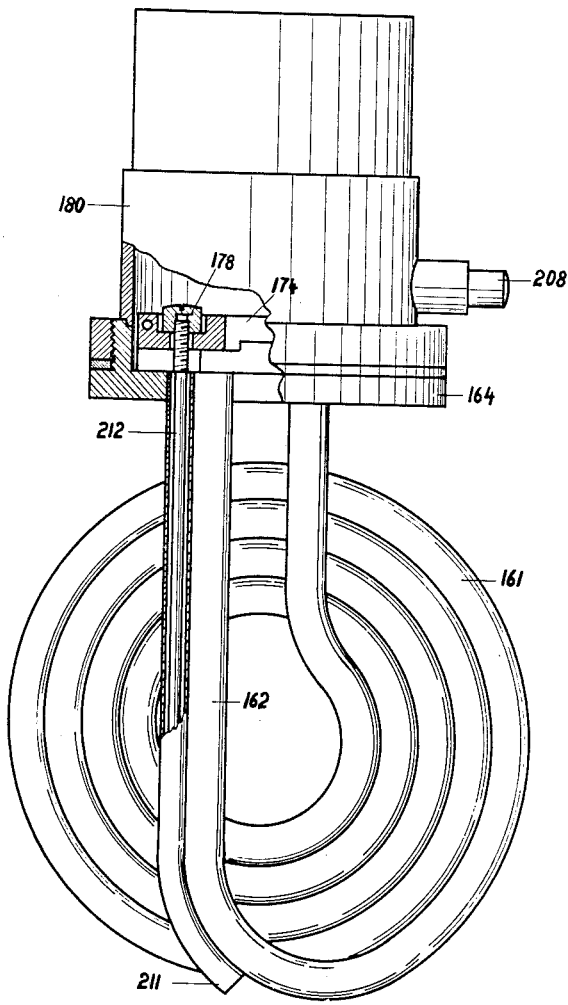
Figure 16 is a further modification, partially broken away and in section, showing the expansion rod in a tube exterior to the heater shank.

In the still further modification of the embodiment of Figures 14 and 15 shown in Figure 16, the expansible rod 212 of the switching mechanism is housed in a tube 211 of heat conducting material parallel, and adjacent, to the heater shank 162, preferably in longitudinal contact with the adjacent surface region of the heater shank. As shown in the figure, tube 211 extends preferably the full length of the heater shank and along a portion of the outer turn of the heating coil 161 at a region thereof remote from the metal plate 164 in the kettle wall 160. The expansible rod 212, of a material of a lower coefficient of thermal expansion than that of tube 211, is affixed at its far end to the closed end region of tube 211 and is threaded at its other end portion extending through the lever 174 to receive the nut 178. The remaining switching elements of this embodiment within the ring member are as shown in either of the embodiments of Figures 12 and 15.

What I claim is:

1. Electrical immersion heater according to claim 5 in which an electrical visual indicating means and an electroacoustic indicating means are housed within the handle, the visual indicating means being in the circuit from the source of electric potential to the heating means in such manner as to be actuated while the source is connected and the switching means is closed and the acoustic indicating means being in the circuit from the source to the heating means in such manner as to be actuated while the switching means is open and the source is connected.

2. Electrical immersion heater according to claim 5 in which a connector connects the source of electric potential to the heating means, the connector having a hollow housing at the end adjacent the heater, an electroacoustic indicator within the connector housing adapted to be actuated when the switching means is in the heating means disconnect position, and an electrical visual indicator within the connector housing adapted to be actuated when the switching means is in the heating means connect position.

3. Electrical immersion heater comprising a heating coil, a shank, a hollow handle, a thermally responsive element within the shank and having one end spatially fixed to the shank in the region thereof near the heating coil and its other end freely extending into the handle, the material of the shank having a greater coefficient of thermal expansion than the element, a system of levers of which the individual levers are normally aligned with each other within the handle, an elbow on one lever of the system adapted on differential thermal expansion of the element and the shank to displace the levers from alignment, a pair of spaced contacts within the handle, a source of electric potential external the handle connected between the spaced contacts, and a bridging member carried by another lever of the system adapted to engage the contact pair when the levers are aligned with each other and to be removed from engagement with the pair of contacts on displacement of the levers from alignment.

4. Electrical immersion heater according to claim 3 in which the thermally responsive element is a metal rod, a stop adjustable on the end of the rod within the handle, the stop on expansion and contraction of the rod moving in a path into which an end of the elbow of the one lever projects, and means operable from exterior the handle and extending into the handle to variably position the stop on the rod end to establish coincidence between a predetermined high temperature and the distance to be travelled by the stop before engaging the elbow end to displace the alignment of the levers.

5. Electrical immersion heater comprising heating means, a hollow handle, a shank connecting the heating means and the handle, switching means within the handle adapted to connect a source of electrical potential to the heating means, thermally responsive means adapted to actuate the switching means, and selective means within the handle and independent of the spatial position occupied by the heater operable from the exterior of the handle to condition the switching means to either the condition where it will be actuated once to disconnect the heating means from the source or to the condition where it will successively be actuated to disconnect and reconnect the heating means and the source repeatedly.

6. Electrical immersion heater according to claim 3 in which the thermally responsive element has a stop at the end region thereof extending into the handle, the stop on expansion and contraction of the thermally responsive element moving in a path into which an end of the elbow of the one lever projects, the end of the one lever remote from the end of the elbow projecting into the path of the stop being bifurcated, a pin supported in the handle wall extending through the bifurcation of the one lever end substantially transversely to the one lever, a shoulder on hte pin between the one lever end and the handle wall and relatively remote from the one lever, a coiled spring loosely about the pin between the shoulder and the one lever end and of an untensioned length less than the distance between the one lever and the shoulder and of such diameter that its end coils are braceable by the bifurcated one lever end and the shoulder, and means for selectively manually moving from outside of the cover the shoulder toward the bifurcated one lever end to brace and tension the spring to bias the one lever in such direction that on movement of the stop during the cooling of the thermally responsive element from the elevated temperature at which the system of levers is displaced from alignment the system of levers moves to realignment under the tension of the spring ultimately to engage the bridging member to the contact pair.

7. Electrical immersion heater according to claim 3 in which the thermally responsive element has a stop at the end region thereof movable within the handle, the stop on expansion and contraction of the thermally responsive element being adapted to move in a path into which an end of the elbow of the one lever projects, and a reset means extends into the handle from the outside thereof comprising a pin and a bias element, the bias element being adapted normally to position the end of the pin within the handle a distance from the one lever carrying the elbow, the reset means on being pushed to move the pin further into the handle engaging the inner pin end to the one lever and realigning the system of levers providing the then position of the stop in its path permits the end of the elbow adjacent to the stop to move.

8. Electric immersion heater comprising a heating coil, a shank, a hollow handle, a thermally responsive element within the shank having one end spatially fixed to the shank in the region thereof near the heating coil and its other end freely extending into the handle, material of the shank having a greater coefficient of thermal expansion than the element, a pair of spaced contacts within the handle to which the heating coil is connected and adapted for connection of a source of electric potential, a flat spring, a bridging member carried by the flat spring and adapted on engaging the pair of contacts to close the circuit connecting the source and the coil, a stop on the freely extending end region of the thermally responsive element, a latching means having its respective cooperating parts on the stop and on the flat spring, the latching means in latched condition holding the bridging members in engagement with the spaced pair of contacts, the stop on relative displacement between the element and the shank on thermal expansion thereof moving in the direction to unlatch the stop from the spring ultimately at a predetermined temperature to disengage the bridging member from the pair of contacts, and a pin extending through the handle in the path of movement of the spring and operable from outside the handle to push against the spring to carry the unlatched spring to the position in which the bridging member engages the contact pair and in the relative position of the element and the shank at a temperature below the predetermined temperature to lock the latching means.

9. Electrical immersion heater according to claim 8 in which a means within the handle operable from the exterior of the handle is adapted variably to position the stop on the element to establish coincidence between a desired high temperature and the distance to be traveled by the stop before unlatching the latching means.

10. Electrical immersion heater comprising a heating coil, a housing, a thermally responsive element, a shank extending from the housing to the heating coil, the thermally responsive element being within the shank and having its end near the heating coil affixed to the shank and its other end extending freely into the housing, the material of the shank having a greater coefficient of thermal expansion than that of the element, a pair of spaced contacts within the housing to which the heating coil is connected and to which an external source of electric potential is connectable, a pin extending from the outside of the housing thereinto in the region of the contact pair, a bridging member on the pin and adapted on pressing the pin toward the contact pair to engage the contact pair, a first spring about the pin and tensioned in such direction as to position the pin that the bridging member is disengaged from the contact pair, a latching member integral with the pin, a lever pivoted at an end region thereof, a hook at the free end of the lever and adapted to engage the latching member to lock the pin in the position at which the bridging member engages the contact pair, a coupling between the freely extending end of the thermally responsive element and the lever at a region thereof close to the pivoted lever end, and a second spring biasing the lever in such direction that the hook tends to engage with and lock to the latching member, the relative positioning of the shank and the thermally responsive element on the expansion of both tending to rotate the lever about its pivot against the bias of the second spring ultimately to remove the hook from the latching member on a predetermined amount of lever rotation.

11. Electric immersion heater according to claim 10 in which the casing is integrally attached to the wall of a heating vessel so that the heating coil is spaced relatively a short distance from the bottom of the heating vessel, the heating coil is a flat spiral of which the coils are substantially coplanar, and the coupling between the lever and the thermally responsive element is adjustable so that the lever movement required to remove the hook from the latching member on heating the element and the shank coincides with the desired predetermined elevated temperature.

12. Electric immersion heater according to claim 10 in which the thermally responsive element is also the electrical connection from one end of the heating coil to one contact of the pair.

13. Electrical immersion heater comprising a heating coil, a shank, a housing, a thermally responsive element cooperating with the shank and having its one end spatially fixed relative to the shank in the region thereof near the heating coil and its other end freely extending into the housing, the material of the shank having a greater coefficient of thermal expansion than that of the element, a pair of terminals extending into the housing and adapted to have a source of electrical potential external to the housing connected thereto, an angle spring lever of electrically conductive material supported on the interior of the housing and electrically connected to one terminal of the pair, a contact within the housing and electrically of the pair, a contact within the housing and electrically connected serially through the heating coil to the other terminal of the pair, the spring lever being so preformed and supported that its free end is normally out of engagement with the contact, a plate spring having one end insulatingly supported and affixed to the free end region of the spring lever and having its other and free end bent back over its affixed end, a lever pivoted at an end region, a hook on the free end region of the lever and adapted to engage the free end region of the plate spring to engage in turn the free end of the spring lever to the contact, a connection between the freely extending end region of the thermally responsive element and the lever near the pivoted end of the lever, and a compression spring biasing the lever in such direction to engage the hook to the free end region of the plate spring, the relative positioning of the shank and the thermally responsive element on the expansion of both tending to rotate the lever about its pivot against the bias of the compression spring ultimately to remove the hook from the free end region of the plate spring after a predetermined amount of lever rotation to disengage the free end region of the conductive spring lever from the contact.

14. Electrical immersion heater according to claim 13 in which the thermally responsive element is in an individual heat conductive tube of the length of the shank from the housing to the heating coil, the tube being in contact with the shank for its whole length.

15. Electrical immersion heater according to claim 13 in which the one terminal of the pair is a hollow tube extending through the housing wall, the connection between the pivoted lever and the thermally responsive element includes a threaded end region of the element extending through the lever and a nut on the threaded end region bearing against the face of the lever opposite to that against which the compression spring acts, the nut being coaxial with the hollow tube terminal and having at least one slot in its surface facing the terminal to enable adjustment of the nut on the threaded end region of the element through the tube.

16. Electrical immersion heater according to claim 13 in which a stop is positioned within the housing adapted to limit the movement of the free end region of the plate spring on disengagement of the hook therefrom in the direction of disengagement of the contact from the end region of the electrically conductive angle spring lever, and spring biased means extending into the housing adjacent the stop is adapted on manual operation to move the free end region of the plate spring to such position that the hook may engage it providing the position of the lever permits of the engagement.

References Cited in the file of this patent

OTHER REFERENCES

| | | |
|---|---|---|
| 1,599,912 | Naujoks | Sept. 14, 1926 |
| 1,837,000 | Wertz | Dec. 15, 1931 |
| 2,039,641 | Fichtner | May 5, 1936 |
| 2,120,937 | Kronmiller | June 14, 1938 |
| 2,163,801 | Newell | June 27, 1939 |
| 2,593,812 | Turner | Apr. 22, 1952 |